(12) United States Patent
Johnson et al.

(10) Patent No.: US 8,352,094 B2
(45) Date of Patent: Jan. 8, 2013

(54) TECHNIQUE FOR AGGREGATING LOADS WITH TIME-VARYING OPERATING CYCLES

(75) Inventors: Jay T. Johnson, Atlanta, GA (US);
Daniel H. Greene, Sunnyvale, CA (US);
Haitham Ali Salem Hindi, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 393 days.

(21) Appl. No.: 12/406,006

(22) Filed: Mar. 17, 2009

(65) Prior Publication Data
US 2010/0241285 A1   Sep. 23, 2010

(51) Int. Cl.
*G06F 1/32* (2006.01)
(52) U.S. Cl. .................... 700/296; 700/291; 700/36
(58) Field of Classification Search .............. 700/296, 700/291, 36
See application file for complete search history.

(56) References Cited

U.S. PATENT DOCUMENTS
2004/0095237 A1 * 5/2004 Chen et al. .................. 340/506

FOREIGN PATENT DOCUMENTS
WO    WO 2009020606 A1 *  2/2009

* cited by examiner

*Primary Examiner* — Tejal Gami
(74) *Attorney, Agent, or Firm* — Shun Yao; Park, Vaughan, Fleming & Dowler LLP

(57) ABSTRACT

Embodiments of a system, a method, and a computer-program product (e.g., software) for aggregating an energy service from a group of loads with time-varying operating cycles are described. This aggregation may be performed by an aggregator, which provides the energy service to a power-system operator. In particular, for a desired demand response, a demand-response mechanism may modify a demand response of a given load by mapping an initial operating cycle of the load before a demand-response event to a final operating cycle. In addition, the demand-response mechanism may transition the given load to a new operating cycle associated with the demand-response event using a temporal set-point trajectory. This aggregation technique may ensure that a distribution of phases of the group of loads is, on average, uncorrelated with each other, either by preserving or modifying the distribution of phases prior to the demand-response event.

22 Claims, 8 Drawing Sheets

TECHNIQUE FOR AGGREGATING LOADS WITH TIME-VARYING OPERATING CYCLES

BACKGROUND

1. Field

The present disclosure relates to techniques for aggregating one or more loads in a power system in order to provide an energy service. More specifically, the present disclosure relates to desynchronizing the phases of loads with time-varying operating cycles in order to provide more reliable aggregate energy services.

2. Related Art

In traditional electricity markets, economic mechanisms are frequently used to arrive at accurate incentives and to dispatch services. For example, an operator of a power system, such as an independent system operator (ISO), may request bids up to 24 hours in advance of a desired service. In response to the request, one or more suppliers, such as a power plant, may bid to supply power or ancillary services (such as regulation, load following, spinning reserve, non-spinning reserve, replacement reserve and/or other services that help maintain power system stability in response to unanticipated variations in the supply and demand of electricity.). Based on the received bids, the ISO may select or dispatch the services it needs to operate the power system or grid. In the case of contingency services (e.g., spinning reserve), the ISO may dispatch the services and compensate the corresponding suppliers for being available, even if these suppliers are not subsequently required to provide power.

With the deregulation of electricity markets, and the increased integration of communication and control technology in power systems, it is increasingly attractive for flexible electricity consumers (such as individual residences, as well as small and medium-sized businesses, which are henceforth collectively referred to as 'participants') to supply energy services to an ISO. For example, residential consumers of electricity can, in principle, provide ancillary services by shifting their consumption of electricity relative to their baseline consumption patterns. Typically, an aggregator in the power system combines and coordinates the supply and/or demand of multiple participants in order for the aggregate energy service to meet the needs of the ISO.

However, the participants may not be able to offer the same quality of service that an aggregator needs to provide to the ISO. For example, it can be difficult to aggregate loads that operate by cycling on/off, such as heating, ventilating and air-conditioning (HVAC) units that are thermostatically controlled. Because of the uncertainty about which loads will currently be 'on,' when an aggregator attempts to combine cycling loads to offer an immediate predictable load reduction, there typically is uncertainty about the total demand reduction that can be immediately achieved.

Hence, what is needed is a method and a system that facilitates aggregation of the energy service without the problems listed above.

SUMMARY

One embodiment of the present disclosure provides a system to aggregate an energy service from a group of loads with time-varying operating cycles. During operation, the system determines a final operating cycle for a load after a demand-response event. Then, the system maps an initial operating cycle for the load to the final operating cycle, such that a phase of the final operating cycle is in accordance with a characteristic of a distribution of phases of the group of loads. Next, the system uses a set-point trajectory to transition the load from an initial operating cycle prior to the demand-response event to a final operating cycle. This transition may be after the demand-response event, and may achieve a change in a desired average amount of the energy service from the group of loads, which is associated with the demand-response event.

Note that determining the final operating cycle may involve generating an operating model of the load, such as a thermodynamic model of temperature in an enclosure.

Moreover, a given operating cycle may include a steady-state duty cycle and phase. Additionally, the given operating cycle may include transitions to a higher power-consumption operating mode or to a lower power-consumption operating mode. This system may allow the load to transition from the initial operating cycle to the final operating cycle without experiencing additional cycles.

In some embodiments, the mapping preserves the characteristic of the distribution of phases of the group of loads from before the demand-response event. For example, the characteristic may include, on average, uncorrelated phases in the distribution of phases. Alternatively, the mapping may change the characteristic of the distribution of phases of the group of loads from an initial characteristic from before the demand-response event to one with, on average, uncorrelated phases.

Furthermore, the change in the desired average amount of the energy service may occur immediately at the demand-response event without requiring a delay in an occurrence of any subsequent demand-response event in order to return the system to a state where the demand response is more predictable for purposes of aggregation.

In some embodiments, the system calculates an appropriate contribution by the load to the desired average amount of the energy service, which is associated with the demand-response event, based at least in part on a price offered for the energy service and an associated disutility of the load.

Note that the mapping may be used to directly control power cycling of the load. However, in many control systems it is desirable to control for an operating characteristic, such as the temperature. In other embodiments (such as in legacy equipment), the primary way to interact with the load controller is via its set point. For these reasons we may use a set-point trajectory, where the initial operating cycle and the final operating cycle are set-point temperatures (i.e., there is indirect control of the power cycling of the load), and the transition occurs over a time interval.

A variety of techniques may be used to determine the set-point trajectory. For example, the set-point trajectory may be determined using one or more operating points after the demand-response event and a closed-form expression for the variation in the operating point as a function of time, such as an exponential function. Alternatively or additionally, the set-point trajectory may be determined using the initial operating point, the final operating point and a dependence of an operating point of the load corresponding to the final operating cycle (which may be associated with the thermodynamic model of temperature in the enclosure).

In some embodiments, the system includes a computer system.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

Figure 1:
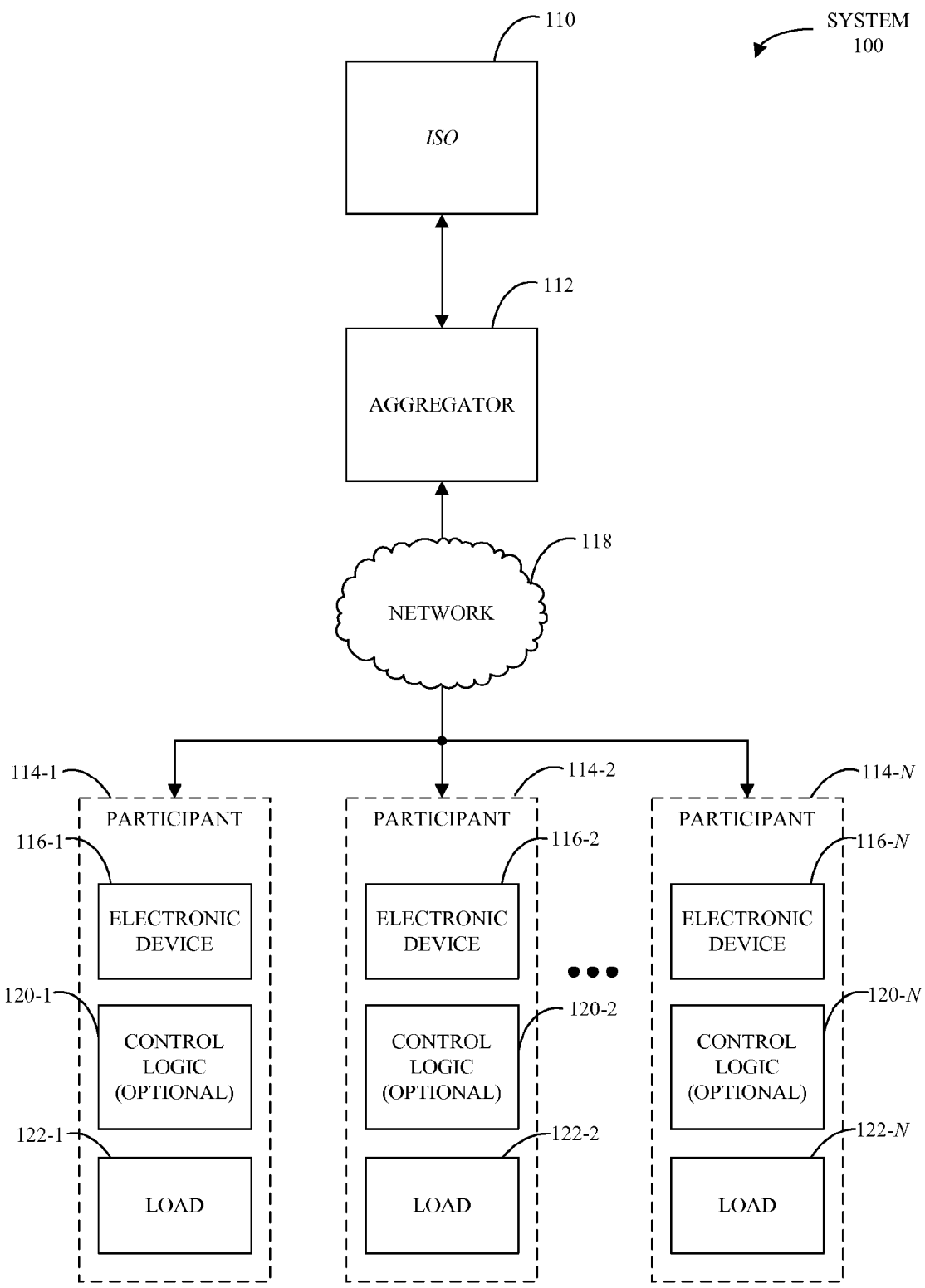
FIG. 1 is a block diagram illustrating a system in accordance with an embodiment of the present disclosure.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a system, a method, and a computer-program product (e.g., software) for aggregating an energy service from a group of loads with time-varying operating cycles are described. This aggregation may be performed by an aggregator, which provides the energy service to a power-system operator. In particular, for a desired demand response, a demand-response mechanism may modify a demand response of a given load by mapping an initial operating cycle of the load before a demand-response event to a final operating cycle. In addition, the demand-response mechanism may transition the given load to a new operating cycle associated with the demand-response event using a temporal set-point trajectory. This aggregation technique may ensure that a distribution of phases of the group of loads is, on average, uncorrelated with each other, either by preserving or modifying the distribution of phases prior to the demand-response event.

By aggregating the energy service, this aggregation technique can facilitate increased economy of scale (such as that offered by larger energy providers) and improved quality or reliability (e.g., the ability to reliably provide the desired amount of the energy service to the power-system operator). Furthermore, the aggregation technique can: immediately deliver the desired demand response (such as a power reduction) with a probability and expectation value equal to that associated with the demand-response event (i.e., the requested demand response), which, when aggregated over multiple loads at diverse phases, provides immediate and predictable results; maintain desynchronization of the load phases, so that the actual aggregated response will be predictable and so that the loads are immediately available to respond to new demand-response requests (i.e., new demand-response events); and gradually allow the operating point or set-point to reach the level and disutility allowed (i.e., tolerated) in the requested demand response so that the requested demand response is delivered with minimal impact on users. Note that this aggregation technique may efficiently utilize hardware and/or may be compatible with constraints on communication between the aggregator and the participants, who provide the loads.

In the discussion that follows, 'energy services' refers broadly to: a demand response in which at least some of the participants agree to reduce their energy demand, the generation of power by at least some of the participants, and/or ancillary services that include load, supply or both. Moreover, values of supply or load can be positive or negative. Note that negative demand response (i.e., a decrease in demand) is equivalent to positive power generation. Similarly, positive demand response (i.e., an increase in demand) is equivalent to negative power generation.

We now discuss embodiments of a technique for aggregating an energy service. In a power system, an ISO may use energy services to dynamically match overall supply and load. Typically, an ISO predicts the energy load, and uses optimizations and market mechanisms to arrange the required primary and ancillary services to successfully operate the power system.

In existing approaches, the providers of energy services are often large power plants or, for demand response, large industrial loads. However, with the advent of small renewable resources, and the possibility that participants (such as homes and small businesses) can provide power and/or demand response, there is an opportunity to aggregate small and typically low-quality energy services from multiple participants into larger and better quality energy services for the power system. As shown in FIG. 1, which presents a block diagram illustrating a system 100, this aggregation can be implemented by an aggregator 112, which may be a utility company or a third party. Moreover, aggregator 112 may reside at one or more locations in system 100 (thus, the function of aggregator 112 may be distributed in system 100). As described further below, in some embodiments, information that is used by aggregator 112 is collected or received using electronic devices 116 that are distributed at the locations of participants 114.

After the energy service is aggregated, aggregator 112 may: sell it directly to ISO 110, couple it with other sources (such as wind) to improve the overall value in the power system, and/or combine it with other loads to reduce the overall cost. Furthermore, the aggregated energy service may allow ISO 110 to perform regulation and/or load following in the power system. For example, the regulation may occur over a time interval that is less than 15 seconds and/or the load following may occur over a time interval that is less than one minute.

However, it can be difficult and expensive to rapidly and accurately select (or dispatch) low-quality energy services to create high-quality aggregate energy services. For example, different parties in system 100, such as ISO 110, aggregator 112 and participants 114, each may need to perform optimization calculations that determine the prices and amounts of energy services. Thus, a given participant (such as participant 114-1) may attempt to balance the impact or disutility of any changes in demand (e.g., changes to the temperature in their homes) with the commensurate economic reward; aggregator 112 may attempt to balance the price offered by ISO 110 for a desired energy service versus the fees paid to participants 114; and ISO 110 may attempt to obtain a desired amount of energy service while minimizing the total disutility or cost in system 100. Unfortunately, the different parties in system 100 may not have sufficient inter-party information to perform these coupled optimization calculations.

To address this problem, a fast-acting and accurate embedded economic mechanism may be used to help mediate between aggregator 112 and participants 114. This embedded economic mechanism may decouple the optimization calculations, thereby allowing the different parties to calculate their roles in the aggregate energy service using only limited inter-party information. For example, in an iterative aggregation technique, aggregator 112 may suggest a price to participants 114, for example, via a network 118 (such as the Internet) and electronic devices 116. In response, a given participant (such as participant 114-1) may provide a bid or some approximation to a supply function (which is sometimes referred to as a 'supply-function approximation'). This supply function may include a relation between the supply (or demand) as a function of the price of the energy service, and a given supply-function approximation may approximate the overall supply function in proximity to the suggested price (e.g., the given supply-function approximation may include a slope or a tangent to a supply function at the suggested price).

Using bids or supply-function approximations from participants 114, aggregator 112 can calculate a purchase price necessary to aggregate and provide the desired energy service for ISO 110. Moreover, by exchanging information in this way, aggregator 112 and at least a subset of participants 114 may rapidly converge on a solution without oscillations. Consequently, this aggregation technique may facilitate improved aggregate energy services and better performance of the power system by determining the amount and the price of the energy service, and by simplifying the interaction between aggregator 112 and participants 114 (and, thus, the architecture of system 100).

In some embodiments, participants 114 select current supply-function approximations from a set of predetermined functions. For example, electronic devices 116 at participant locations may include buttons or icons on a display corresponding to the predetermined functions, and participants 114 may select current supply-function approximations by pressing the buttons or activating the icons. Then, electronic devices 116 may communicate the selected current supply-function approximations to aggregator 112 using network 118.

Note that a given electronic device, such as electronic device 116-1, may include a centralized device and/or a distributed device at the corresponding participant location. Consequently, in some embodiments, electronic devices 116 communicate with and collect information (such as power consumption and/or the disutility caused by the demand response or a reduction in power consumption) from appliances and electrical equipment at the participant locations. This information may be used by optional control logic 120 to make bids or select current supply-function approximations for participants 114. Participants 114 may update instructions to optional control logic 120, periodically or as needed, so that optional control logic 120 appropriately balances the disutility versus the reward for participants 114.

In addition to these economic optimization problems, it can be difficult to provide a high-quality energy service when aggregating loads 122 at participant locations that operate by cycling on/off, such as HVAC units that are thermostatically controlled. If an aggregated energy service is offering an immediate predictable load reduction by combining cycling loads 122, there is uncertainty about which loads 122 will currently be 'on,' and consequently there is uncertainty about the total reduction that can be immediately achieved. If the phases in the operating cycles of loads 122 are uncorrelated, and at least a modest number of loads are aggregated together (such as 20-100 loads), then the law of large numbers predicts that the actual demand response or change (such as an energy-consumption reduction) associated with a demand-response event (such as a requested change in energy consumption) will be very close to the average expected demand response.

This kind of predictability can be very useful to an aggregator, such as aggregator 112, that is managing the risk of providing an actual demand response via a combination of over-provisioning demand requests to the individual loads 122 of participants 114 and/or infrequently paying a penalty for not meeting the overall desired demand response or target. In either case, if aggregator 112 can assume that cycling loads 122 are at uncorrelated random phases, it will greatly reduce the complexity and cost of the aggregator's management problem.

In the discussion that follows, an aggregation technique for maintaining desynchronization of cycling loads 122 when they are responding to frequent demand-response events or requests is described. This aggregation technique may modify the demand response by deliberately mapping the phases of the pre-existing or initial operating cycles of loads 122 uniformly onto the phases of new or final operating cycles. Then, rather than simply allowing a given load (such as load 122-1) to adjust on its own to the new operating or set-point associated with a given demand-response event, a set-point trajectory may be computed that will eventually arrive at the target set-point. This set-point trajectory may immediately achieve the new phase of the given load required by the mapping.

To facilitate this aggregation technique, electronic devices 116 may collect information from load controllers (such as a duty cycle and/or phase of the initial operating cycles), and may provide signals or instructions associated with the final operating cycles, operating points and/or set-point trajectories to the load controllers. In this way, electronic devices 116 may transition loads 122 to the new or final operating cycles after the given demand-response event, while ensuring that the phases of loads 122 are or remain desynchronized.

Figure 2:
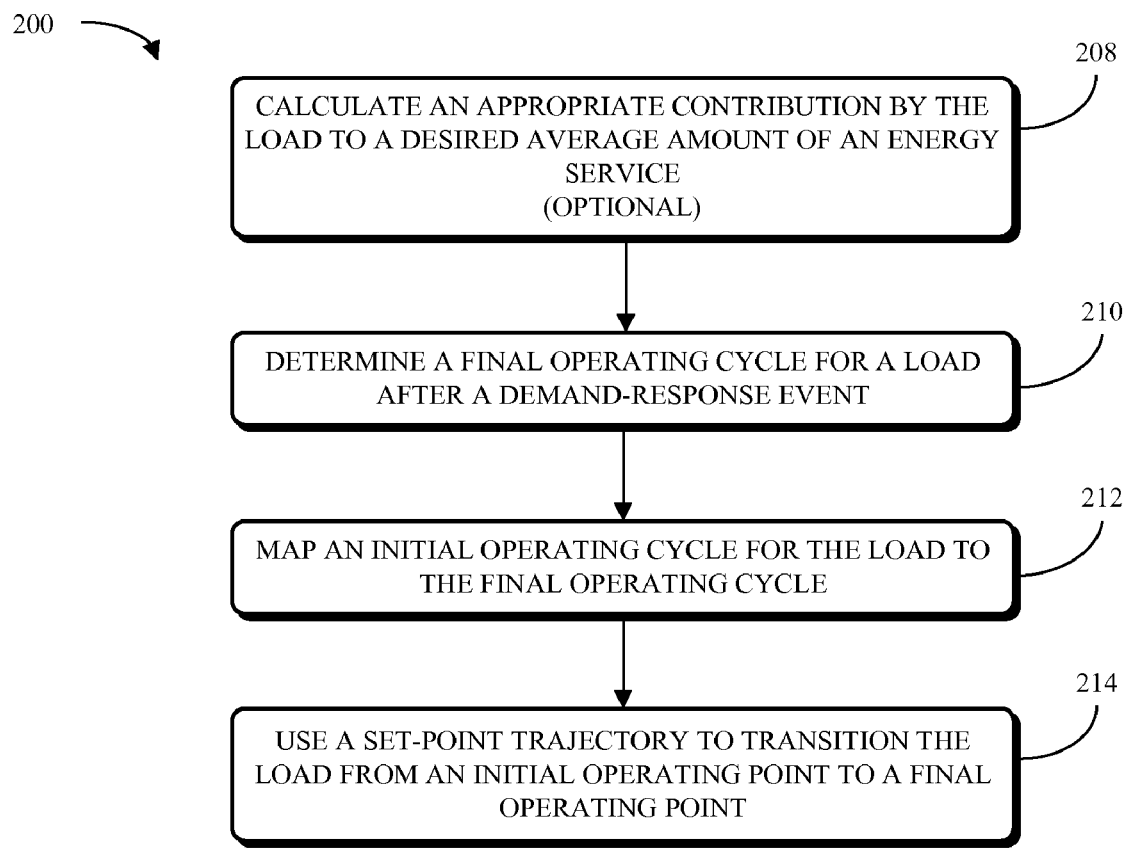
FIG. 2 is a flow chart illustrating a process for aggregating an energy service in accordance with an embodiment of the present disclosure.

FIG. 2 presents a flow chart illustrating a process 200 for aggregating an energy service from a group of loads with time-varying operating cycles, which may be performed by a computer system (for example, a computer system that is operated by aggregator 112 in FIG. 1). During operation, the system determines a final operating cycle for a load after a demand-response event (210). (This may involve first determining an average power to be delivered in a demand-response event, based on disutility and reward, and then computing the operating cycle that will result.) Then, the system maps an initial operating cycle for the load to the final operating cycle such that a phase of the final operating cycle is in accordance with a characteristic of a distribution of phases of the group of loads (212). Next, the system uses a set-point trajectory to transition the load from an initial operating cycle prior to the demand-response event to a final operating cycle after the demand-response event thereby achieving a change in a desired average amount of the energy service from the group of loads (214), which is associated with the demand-response event. Note that the set-point trajectory may also transition the load from an initial operating point prior to the demand-response event to a final operating point, and any disutility associated with this transition may be considered in the decision to participate in the demand-response event.

Note that process 200 may allow the load to transition from the initial operating cycle to the final operating cycle without experiencing additional cycles from a higher power-consumption operating mode (such as an 'on' state) to a lower power-consumption operating mode in a given operating cycle (such as an 'off' state), or vice versa.

In some embodiments, the mapping preserves the characteristic of the distribution of phases of the group of loads from before the demand-response event. For example, the characteristic may include, on average, uncorrelated phases in the distribution of phases. This is desirable because in many systems there may be natural sources of random noise that will tend to desynchronize the loads. By asking for immediate simultaneous action from multiple loads, demand response events, if not carefully managed, can introduce undesirable synchronization and correlation between cycling loads. While the natural sources of noise will cause the loads to desynchronize again, there may be a period of time where the aggregator is uncertain about the characteristic of the cycling loads. This problem may be avoided by mappings that preserve the distribution of phases. However, if there is any other reason that the loads may become accidentally synchronized or correlated, this same mapping approach may change the characteristic of the distribution of phases of the group of loads from an initial undesirable characteristic to one with, on average, uncorrelated phases.

Furthermore, the change in the desired average amount of the energy service may occur immediately at the demand-response event without requiring a delay in an occurrence of any subsequent demand-response event. An aggregator can rely on the lack of correlation to make the determination of subsequent demand response events similarly predictable.

In some embodiments, the system optionally calculates an appropriate contribution by the load to the desired average amount of the energy service, which is associated with the demand-response event, based at least in part on a price offered for the energy service and an associated disutility of the load (208).

Note that the mapping computed in operation (212) may be used to directly control the load. However, it is often more desirable to control to a characteristic, such as temperature, that more directly affects the users and which has been used to determine the demand response. This may be accomplished using the set-point trajectory. This approach may facilitate the integration of legacy control systems and the careful management of any disutility of the demand response action.

Note that process 200 may include additional or fewer operations. Moreover, the order of the operations may be changed and/or two or more operations may be combined into a single operation.

Referring back to FIG. 1, we now describe several exemplary embodiments of the aggregation technique. One approach for aggregating cycling loads 122 is to have the individual loads report their phase to aggregator 112, and have aggregator 112 adjust the demand-response request (e.g., the number of loads 122 asked to reduce their energy consumption) to account for the current on/off status of loads 122. However, this burdens network 118 and aggregator 112 with extra information and a level of detail that is not essential to the demand response. Instead, the individual loads may respond to demand-response requests in a way that ensures or maintains an independent random phase in their cycling operation. This allows aggregator 112 to communicate with loads 122 about average energy needs and the cost of demand-response events that would modify the average energy needs, without worrying about the phases of loads 122 in their operating cycles.

Note that rebound effects after demand-response events can be addressed using a randomized approach. In particular, if loads 122 are asked to curtail, they may randomize their return to a high power-consumption operating mode (such as an 'on' operating mode or state). However, this approach typically: requires a longer period of time to randomize the operation of the loads, can introduce significant unnecessary extra disutility, and can make it difficult for the aggregator to invoke a predictable amount of demand response during the recovery period. In the aggregation technique described previously and below, randomization is achieved while providing faster response and allowing more frequent or repetitive demand-response events or actions, such as load following. This aggregation technique may not require loads 122 to delay their return to the 'on' state. Consequently, when aggregator 112 issues frequent requests, it will benefit from the immediate return to randomized operation, as well as from the reduced energy and inconvenience costs to users of system 100.

Additional advantages of the aggregation technique may include: that it introduces no additional cycles for loads 122, so there is negligible additional wear-and-tear; and that it minimizes disutility to participants 114. In this regard, note that in the present discussion we focus on the mechanism to maintain load desynchronization and its costs. Each demand-response request usually involves a careful tradeoff of disutility in response to an adequate financial reward from ISO 110. This disutility and extra cycle cost associated with the aggregation technique are typically not a significant portion of these overall demand-response costs.

Figure 3:
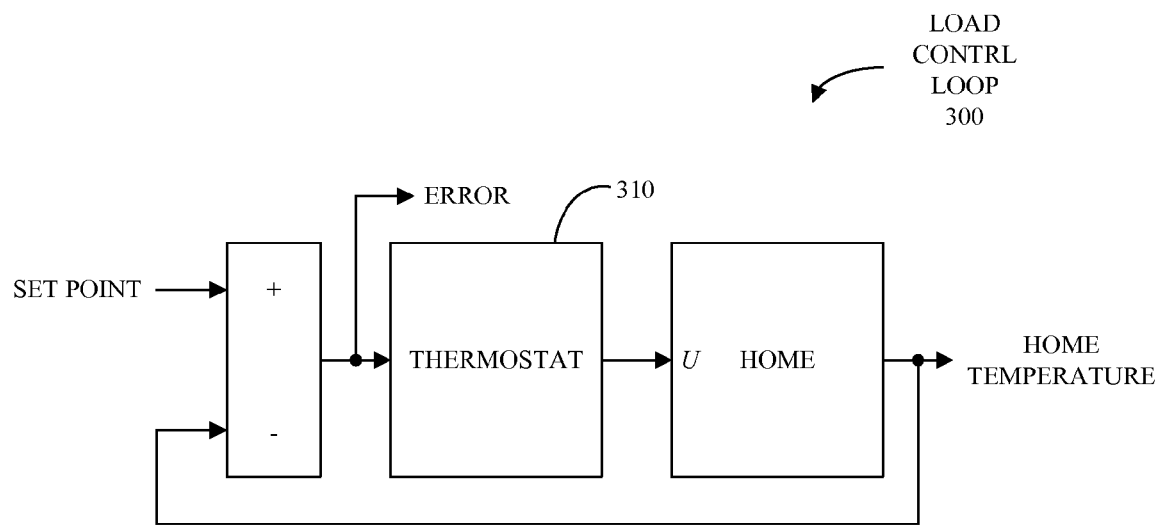
FIG. 3 is a block diagram illustrating a load control loop in accordance with an embodiment of the present disclosure.

As noted previously, in an exemplary embodiment, loads 122 cycle on/off based on instructions or signals from a load controller. FIG. 3 presents a block diagram illustrating a load control loop 300 with a hysteresis element in thermostat 310. When operated under steady-state conditions, this load control loop results in periodic on/off cycling of an associated load. Note that the periodic operating cycle has an associated period and a duty cycle (D), which is the ratio of time the given load is 'on' during the operating cycle. This behavior appears frequently in loads where it is less expensive to design the load (or more efficient to operate the load) at a single, high output level. A control loop, like the one shown in FIG. 3, is often used to achieve the desired intermediate level of output from the load by cycling the load 'on' and 'off.' For example, this behavior may be exhibited by loads, such as: air conditioners (A/C), heaters, circulation pumps, refrigerators and/or water heaters.

For purposes of determining the appropriate demand-response actions (e.g., to offer a reduction in power use to stabilize power-system operation), the average load and the average temperature (or other measure of performance of the given load) may be considered. Using a model of the relationship between these average quantities, it is possible for both individual participants and the aggregator to determine appropriate demand response actions. These actions may be controlled by a variety of economic mechanisms between the ISO, aggregator, and individual participants. For example, a demand-response mechanism at or associated with participants 114 (FIG. 1) may weigh the adverse impact (disutility) to building occupants of a two-degree temperature increase against a price signal from ISO 110 (FIG. 1) or aggregator 112 (FIG. 1), and the demand-response mechanism may use this comparison to take a demand response action, or it may instead make bids to a aggregator, which is then able to make bids to the ISO. It is understood that the control of cycling loads, described in this disclosure, can be beneficial in a variety of different distributed control arrangements between ISOs, aggregators, and participants.

Unfortunately, when loads 122 (FIG. 1) are cycling, a given load offering a demand-response reduction based on its average power use may not, in fact, deliver an immediate reduction in power because this load may already be 'off' in its current phase within the duty cycle. This is one of several 'low-quality' characteristics of an individual load offering demand response that can be improved when multiple loads 122 (FIG. 1) are aggregated together to offer a larger, high-quality service to ISO 110 (FIG. 1), and thus, to the power system. If aggregator 112 (FIG. 1) invokes a demand-response reduction on a collection of loads 122 (FIG. 1) (that are at random phases in their operating cycles), then the loads at an 'off' phase (which provide less reduction than expected) will be balanced by the loads at an 'on' phase (which will provide more reduction than expected). More precisely, the law of large numbers can be used to predict very accurately the demand response that will be achieved. This aggregation will not remove all uncertainty in the demand response, but it will allow aggregator 112 (FIG. 1) to manage this uncertainty very precisely, for example, by over-enrolling an appropriate number of small loads to achieve the reliability required in the aggregate demand response, or by implementing a well-modeled control system to deliver the desired demand response with quantified reliability.

Under most operating conditions, there is considerable noise and diversity in the operation of individual loads 122 (FIG. 1), so it is reasonable to assume that loads 122 (FIG. 1) will be operating at uncorrelated random phases in their operating cycles. However, for fast-acting and frequently invoked demand-response events (i.e., the kind of demand-response services that are useful for providing regulation or load-following energy services), there may be problems associated with correlated behavior that is introduced by invoking demand responses (i.e., by the demand-response events). After a given demand-response event, the noise and diversity in the operation of all loads 122 (FIG. 1) may gradually return system 100 (FIG. 1) to a random state, but it is hard to predict when loads 122 (FIG. 1) will again be at random phases. Therefore, it may be difficult to repeat demand-response events frequently, without allowing adequate time to recover between invocations. Note that a naive demand-response event, which simply shifts the operating point or set point of a home to a new value, typically does not result in re-emergence of a diversity of phases (i.e., desynchronization) after a demand-response event. This can result in a large oscillation in the aggregated demand response of a large number of homes, which is clearly undesirable in a power system.

In order to maintain randomization, the operating cycle behavior of loads 122 (FIG. 1) may be controlled when loads 122 (FIG. 1) respond to a demand-response event. In particular, a model may be used so that a demand-response mechanism or controller (which may be associated with loads 122 at participant locations in FIG. 1) can predict the new (final) operating cycle (duty and period) after a demand-response event. (Note that in some embodiments, the demand-response mechanism may be integrated into the load controller.) Then, a mapping may be used between the old (initial) operating cycle and the new operating cycle that preserves the distribution of phases within the operating cycles (i.e., preserves randomization). Next, a set-point trajectory may be used to move a given load between two temperatures in a way that achieves the targeted new operating-cycle behavior.

Figure 4:
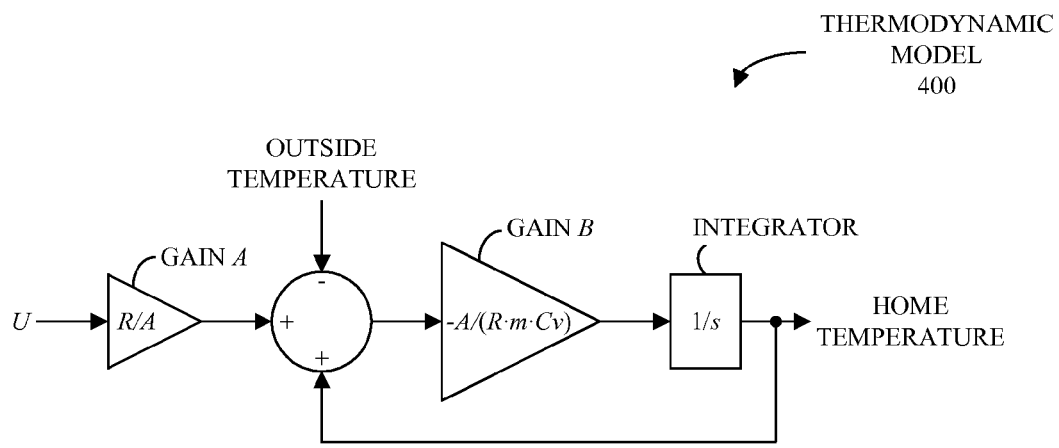
FIG. 4 is a block diagram illustrating a thermodynamic model of temperature in an enclosure in accordance with an embodiment of the present disclosure.

We use a model of the behavior of the given load to predict the new operating cycle after a demand-response event. For purposes of illustration, we will describe an air-conditioning (A/C) load, although these techniques can be applied broadly to an arbitrary cycling load. In the case of A/C, the behavior model of the given load may be a thermodynamic model of a building or enclosure. This is shown in FIG. 4, which presents a block diagram illustrating a thermodynamic model 400 of temperature in an enclosure, such as a home. This model approximates the thermodynamics of the home as a lumped mass with thermal resistance, and the A/C is modeled as a binary thermal input which removes heat from the home at a constant rate. In FIG. 4, A is a surface area of an enclosure, R is an effective thermal impedance, m is the thermal mass, and Cv is the specific heat.

Note that the aggregation technique does not depend on the specific model used. For example, if there were additional sensors in the home, the model may include multiple rooms and the occupancy or open doors in the thermodynamic response of the home. However, for concreteness and illustrative purposes, thermodynamic model 400, which is a first-order linear model, is used.

Furthermore, note that it is likely that a thermodynamic model may also be used to determine the availability of the home for demand-response actions, e.g., balancing the disutility of a temperature rise against the price offered for power savings. If the model is similar to that shown in FIG. 4, the same model that is used to determine the availability of the home for demand response can also be used to maintain desynchronization when a demand-response event occurs. In the first application (determining availability), the model may be used to predict the average temperature rise and the average power savings. In the second application (maintaining desynchronization), the details of the operating-cycle structure (duty cycle and period) may also be predicted. While it is convenient to use the same model for both applications, separate models can also be employed.

We assume that the demand-response controller is either configured with the parameters of the model (e.g., R, A, m, and Cv in FIG. 4) or that the demand-response controller dynamically learns the parameters of the model. Note that it is not necessary that the model be perfectly accurate because there may still be dynamic set-point control of the temperature.

To predict the new operating-cycle structure (duty cycle and phase) after a demand-response event, the models shown in FIGS. 3 and 4 can be combined to simulate the home. Using this approach, we compute the new (final) operating-cycle structure expected if the home were allowed to reach equilibrium (even though frequent demand-response events may not let the home reach that equilibrium). Note that the new operating cycle is sometimes referred to as the target operating cycle.

Figure 5A:
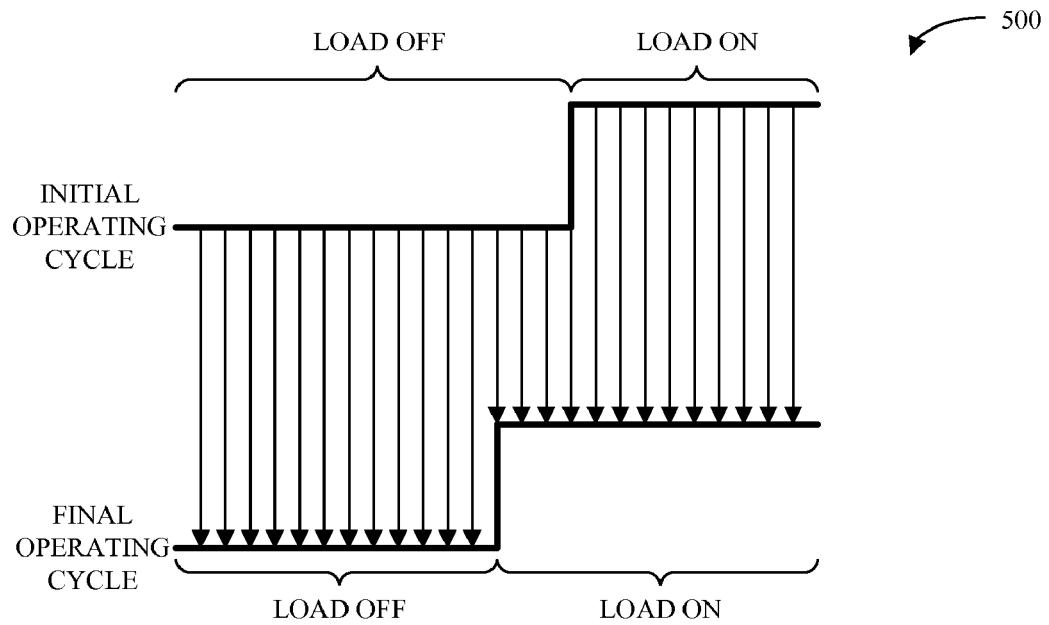
FIG. 5A is a graph illustrating a mapping from a lower to a higher aggregate demand in accordance with an embodiment of the present disclosure.
Figure 5B:
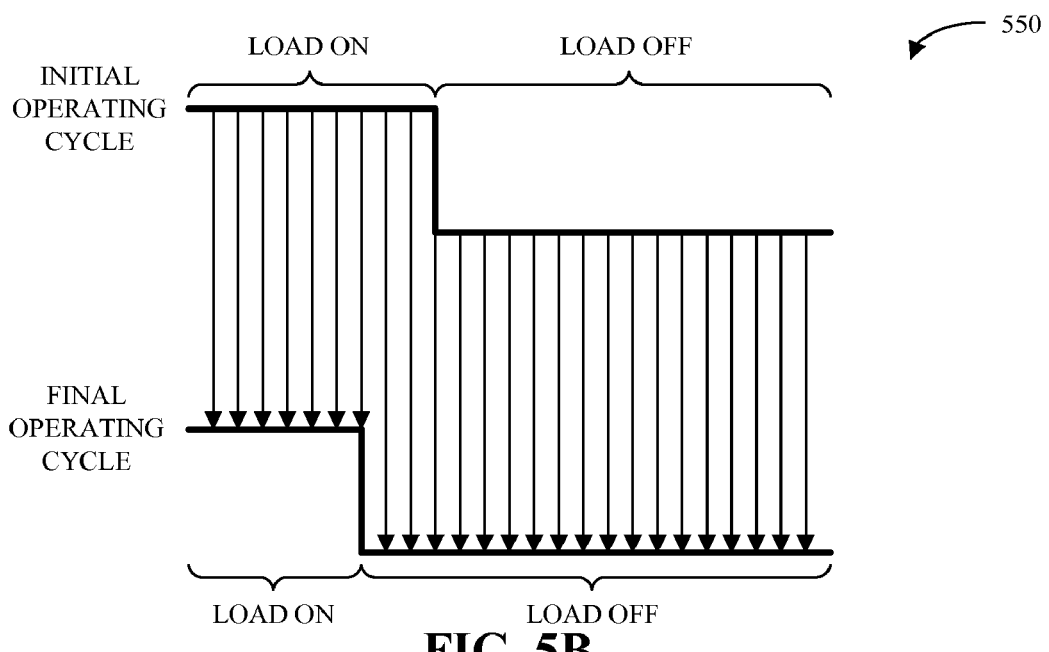
FIG. 5B is a graph illustrating a mapping from a higher to a lower aggregate demand in accordance with an embodiment of the present disclosure.

In the aggregation technique, a measure-preserving mapping of the phase of the current (initial) operating cycle to the phase of the new operating cycle may be used. (Alternatively, if the initial phases of the initial operating cycles of loads 122 in FIG. 1 are correlated or synchronized, the mapping may be used to ensure that, after the demand-response event, the phases are desynchronized. This additional mapping may be unnecessary and can be skipped because it often involves a slight increase in cost, such as disutility and/or more cycles.) Note that the operating-cycle phase may be mapped slightly differently for an increase than for a decrease in average power. In the case of stepping up the average A/C power (decreasing the operating point or set point in the home), the mapping may use the point in time where the A/C turns 'off' as the zero mark of the phase in the operating cycle, as shown in FIG. 5A, which presents a graph 500 illustrating a mapping from a lower to a higher aggregate demand. However, in the case where the average A/C power is decreasing and the set point is increasing, the zero mark of the phase in the operating cycle may be when the A/C comes 'on,' as shown in FIG. 5B, which presents a graph 550 illustrating a mapping from a higher to a lower aggregate demand. This definition may avoid unnecessary additional cycling of the A/C unit.

Furthermore, the operating or set-point temperature of the home may be changed so that the power usage of the A/C transitions immediately to the phase of the new operating cycle given by the mapping. This immediate phase transition, in conjunction with the desynchronized phase of loads 122 (FIG. 1), means that aggregator 112 (FIG. 1) can obtain an immediate aggregate demand response, i.e., the demand response may be extremely fast acting. Moreover, while the temperatures in various homes may transition to the new operating point (and thus, the new operating cycle) gradually over a time interval (for example, the temperatures may each follow approximately an exponential decay to the new target temperature for an increase in demand response), oscillations in the aggregate demand response associated with a given demand-response event may be avoided. In fact, the aggregate demand response may be a step function at the demand-response event, with approximately the same noise or normalized standard deviation about the target temperatures before and after the given demand-response event.

There are several different ways to compute the set-point trajectory. In some embodiments, the power cycling of the A/C is controlled directly. For example, if the demand-response controller is embedded in the A/C controller, it may move the A/C immediately to the new operating cycle. However, in the case of a legacy system, the demand-response controller may vary the set point to extreme temperatures in order to force the A/C 'on' and 'off' at the desired times to match the new operating cycle. Furthermore, these approaches may require an accurate thermodynamic model so that the correct temperature is achieved, or they may require an additional control loop to achieve the correct temperature if the new operating cycle does not deliver the correct temperature. Because A/C controllers are often governed or regulated based at least in part on temperature, we describe how a new operating cycle can be achieved via manipulation of the operating point or set point. This may allow easier integration with typical A/C controllers.

In some embodiments, a set-point trajectory that will achieve a new or target temperature accurately, and which can be integrated with a typical temperature-based A/C controller, is determined using so-called transition knots. In other embodiments, the set-point trajectory is determined using a closed-form expression, such as an exponential function.

Figure 6:
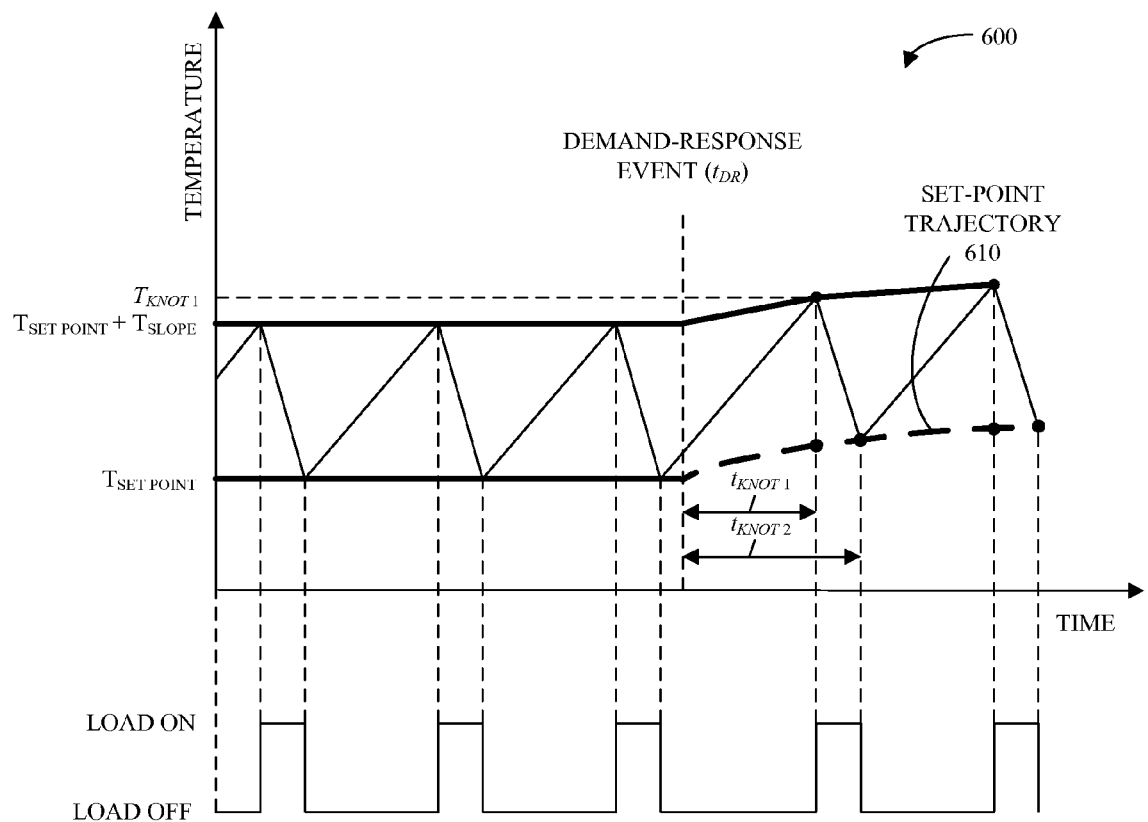
FIG. 6 is a graph illustrating computing a set-point trajectory using transition knots in accordance with an embodiment of the present disclosure.

In the transition-knots technique, thermodynamic model 400 (FIG. 4) is used to calculate the points where the A/C is turned 'on' or 'off' to produce the new operating cycle. (For simplicity, we designate the temperature at the lower end of the control cycle as the 'set point,' and the upper end as the 'set point plus the hysteresis band.') As shown in FIG. 6, which presents a graph 600 illustrating computing a set-point trajectory using transition knots, the transition knots on the upper side, where the A/C turns 'on,' are translated to set points by subtracting the size of the hysteresis band. Then, the set points are piecewise linearly linked together to form set-point trajectory 610.

Figure 7:
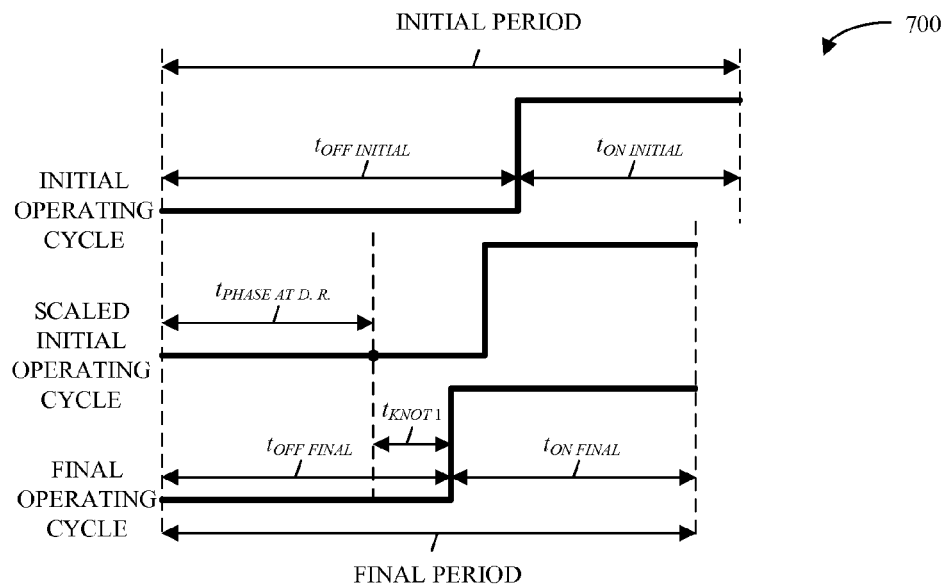
FIG. 7 is a drawing illustrating a transition from an initial operating cycle to a final operating cycle in accordance with an embodiment of the present disclosure.

Once the new level of average power for the home is found, the steady-state set point for the home can be determined. Then, using the thermal characteristics of the home and the A/C unit, the length of time to increase the temperature to the upper bound and cool it to the lower bound is calculated. These time values, called 'load off' and 'load on' in FIGS. 5A and 5B, are used with the current duty cycle times to perform the transition. FIG. 7 presents a drawing 700 illustrating such a transition from an initial operating cycle to a final operating cycle.

In particular, using the current temperature of the home, the location in the duty cycle of the initial operating cycle with set-point temperature $T_{SP1}$ ($t_{PHASE\ AT\ D.R.}$) can be determined using $$t_{PHASE\ AT\ D.R.} = \frac{1}{r} \ln\left(\frac{T_{SP1} - T_{OUTSIDE}}{T_{HOME} - T_{OUTSIDE}}\right)$$

with the A/C 'on,' or $$t_{PHASE\ AT\ D.R.} = \frac{1}{r} \ln\left(\frac{T_{SP1} + T_{SLOPE} - T_{OUTSIDE} + \frac{R}{A} \cdot \dot{Q}_{AC}}{T_{HOME} - T_{OUTSIDE} + \frac{R}{A} \cdot \dot{Q}_{AC}}\right)$$

with the A/C 'off,' where r equals A/(R·m·Cv) and $\dot{Q}_{AC}$ is the heat transfer rate of the A/C. Moreover, the phase of the home in the initial operating cycle (the initial duty cycle) can be determined using $$D_{INITIAL} = D_{FINAL} = \frac{t_{PHASEATD.R.}}{period}.$$

In this example, the duty cycle (D) will be the same for the initial and the new operating cycles. Then, the time of transition knot 1 ($t_{KNOT\ 1}$) may be calculated using $$t_{KNOT1} = t_{FINAL\text{-}PERIOD} - t_{PHASEATD.R.}$$

with the A/C 'off,' or $$t_{KNOT1} = D_{FINAL} - t_{PHASEATD.R.}$$

with the A/C 'on,' where $D_{FINAL}$ is the duty cycle of the final or new operating cycle. (Note that this equation illustrates the case when the average power is being increased and the set point is being lowered. When the average power is being decreased, there is a similar equation.)

Then, the temperature of the home at transition knot 1 ($T_{KNOT\ 1}$) can then be calculated using $$T_{KNOT1} = T_{OUTSIDE} - \frac{R}{A} \cdot \dot{Q}_{AC} + \left(\frac{T_{INSIDE-INITIAL} -}{T_{OUTSIDE} + \frac{R}{A} \cdot \dot{Q}_{AC}}\right) \cdot \exp(-r \cdot t_{KNOT1}),$$

where $\dot{Q}_{AC}$ is zero if the A/C is 'off' at $t_{PHASE\ AT\ D.R.}$ or $\dot{Q}_{AC}$ if the A/C is 'on' at $t_{PHASE\ AT\ D.R.}$. At this point ($t_{KNOT\ 1}$, $T_{KNOT1}$) is found. Note that in order to find the next transition knot, this equation may be reused with $t_{KNOT1}$ being replaced with the appropriate time for 'load off' or the time for 'load on.' This can be repeated to find any point ($t_{KNOT\ N}$, $T_{KNOT\ N}$). Moreover, the transition knots can then be linked together to form set-point trajectory 610 (FIG. 6).

Figure 8:
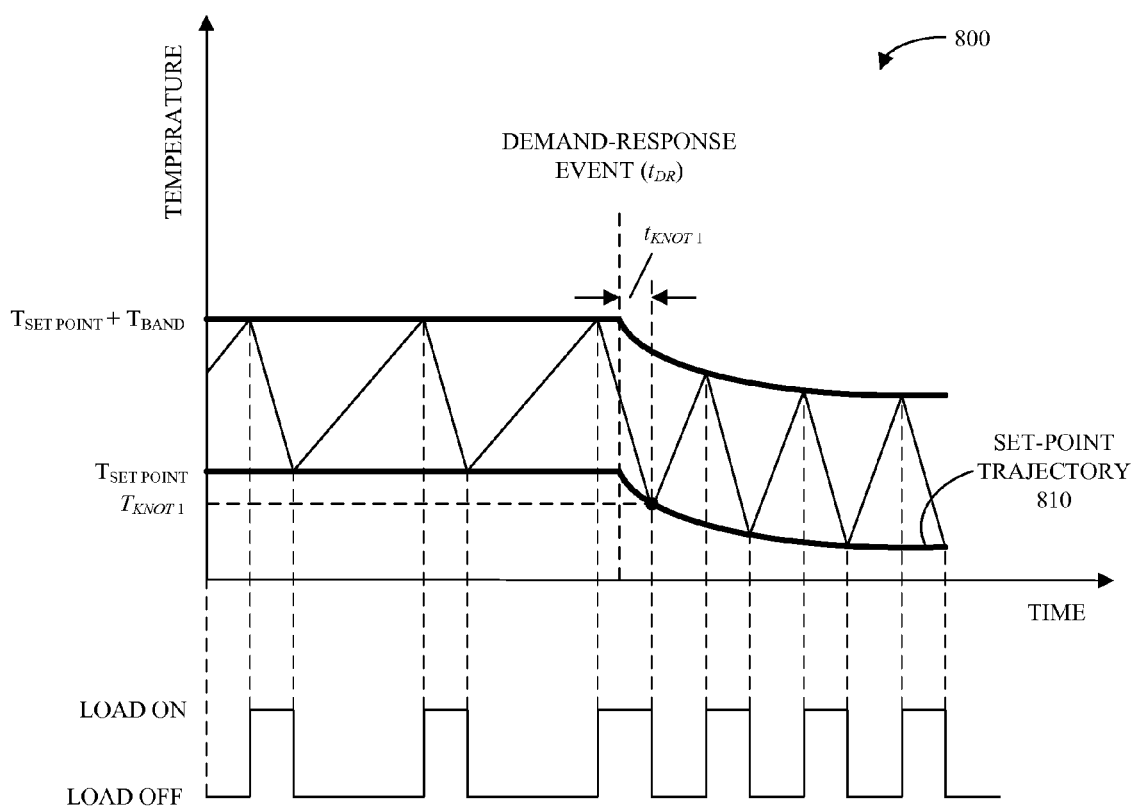
FIG. 8 is a graph illustrating computing a set-point trajectory using an exponential function in accordance with an embodiment of the present disclosure.

In the exponential-function technique, the same approach for finding a point, such as the point ($t_{KNOT\ 1}$, $T_{KNOT\ 1}$), may be used. Once this point is determined, the parameters for an exponential function that intersects all the transition knots from the previous transition-knots technique can be calculated. This exponential-function technique, which uses only a first knot, may be applicable when the home has approximately first-order thermal dynamics. FIG. 8 presents a graph 800 illustrating computing a set-point trajectory 810 using an exponential function. This exponential function is defined by $$T = T_{SP2} + (T_{SP1} - T_{SP2}) \cdot \exp(-r \cdot (t + t_{SHIFT})),$$

where $T_{SP2}$ is the new steady-state set point and $t_{SHIFT}$ is defined below. If transition knot 1 is on the lower boundary, $t_{SHIFT}$ may be found by substituting $T_{KNOT\ 1}$ for $T_{SP2}$ and $t_{KNOT\ 1}$ for t. If transition knot 1 is on the upper boundary, then $t_{SHIFT}$ may be found by substituting $T_{KNOT\ 1} + T_{BAND}$ for $T_{SP2}$ and $t_{KNOT\ 1}$ for t. Thus, $t_{SHIFT}$ may be calculated using $$t_{SHIFT} = \frac{\ln\left(\frac{T_{KNOT1} - T_{SP2}}{T_{SP1} - T_{SP2}}\right)}{-(r + T_{KNOT1})} \text{ or}$$

$$t_{SHIFT} = \frac{1}{(r + T_{KNOT1})} \ln\left(\frac{T_{SP1} - T_{SP2}}{T_{KNOT1} - T_{SP2}}\right)$$

when transition knot 1 is on the lower boundary, or $$t_{SHIFT} = \frac{1}{(r + T_{KNOT1})} \ln\left(\frac{T_{SP1} - T_{BAND} - T_{SP2}}{T_{KNOT1} - T_{SP2}}\right)$$

when transition knot 1 is on the upper boundary.

Figure 9:
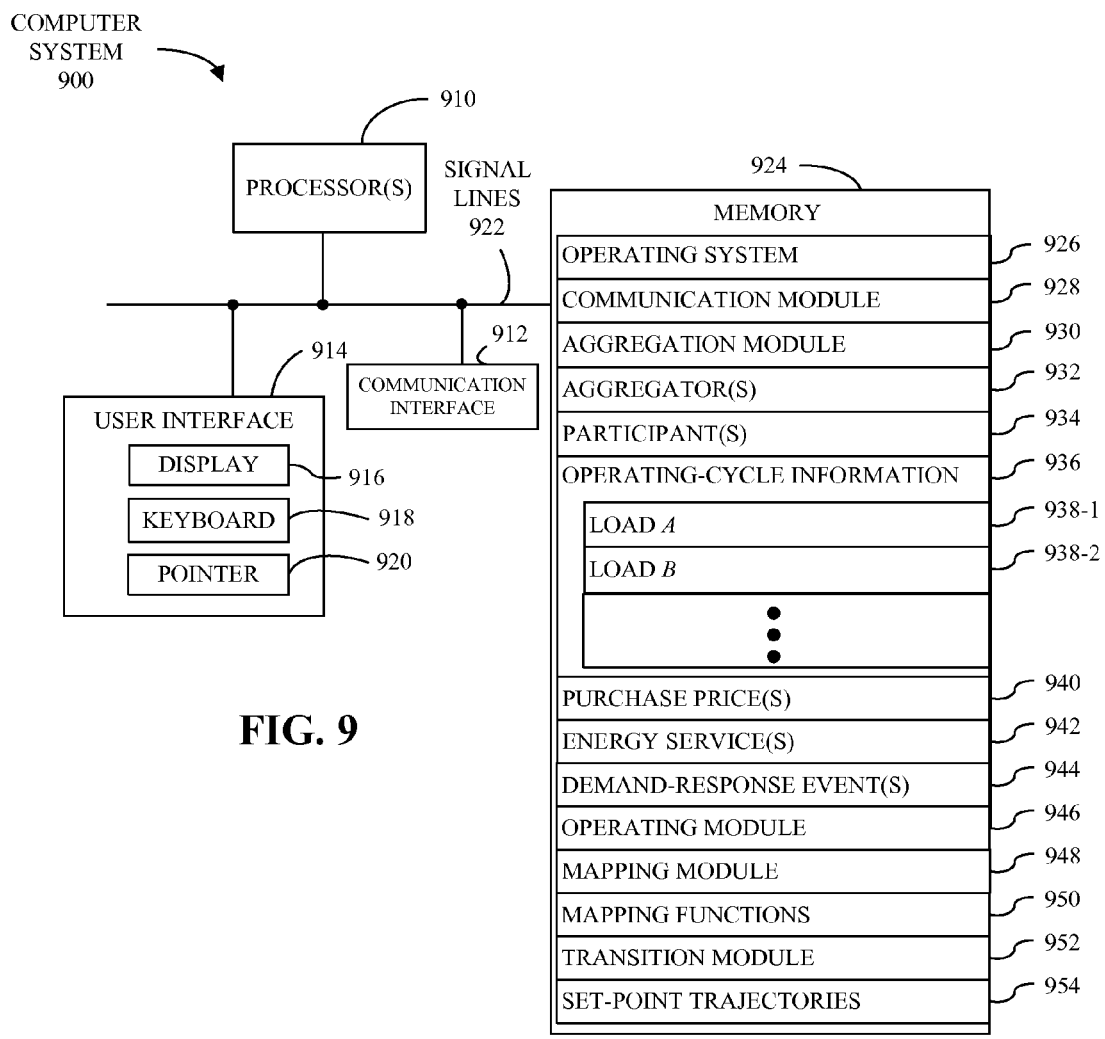
FIG. 9 is a block diagram illustrating a computer system in accordance with an embodiment of the present disclosure.

We now describe embodiments of a computer system that performs process 200. FIG. 9 presents a block diagram illustrating a computer system 900. Computer system 900 includes: one or more processors 910, a communication interface 912, a user interface 914, and one or more signal lines 922 coupling these components together. Note that the one or more processing units 910 may support parallel processing and/or multi-threaded operation, the communication interface 912 may have a persistent communication connection, and the one or more signal lines 922 may constitute a communication bus. Moreover, the user interface 914 may include: a display 916, a keyboard 918, and/or a pointer 920, such as a mouse.

Memory 924 in the computer system 900 may include volatile memory and/or non-volatile memory. More specifically, memory 924 may include: ROM, RAM, EPROM, EEPROM, flash, one or more smart cards, one or more magnetic disc storage devices, and/or one or more optical storage devices. Memory 924 may store an operating system 926 that includes procedures (or a set of instructions) for handling various basic system services for performing hardware-dependent tasks. In some embodiments, the operating system 926 is a real-time operating system. Memory 924 may also store communication procedures (or a set of instructions) in a communication module 928. These communication procedures may be used for communicating with one or more computers, devices and/or servers, including computers, devices and/or servers that are remotely located with respect to the computer system 900.

Memory 924 may also include multiple program modules (or sets of instructions), including: aggregation module 930 (or a set of instructions), operating module 946 (or a set of instructions), mapping module 948 (or a set of instructions) and/or transition module 952 (or a set of instructions). Aggregation module 930 may aggregate one or more participants 934 on behalf of one or more aggregators 932 to provide one or more aggregate energy services 942 at one or more corresponding purchase prices 940. In particular, aggregation module 930 may aggregate cycling loads of one or more participants 934.

In some embodiments, operating module 946 determines operating-cycle information 936, such as operating-cycle information for load A 938-1 or operating-cycle information for load B 938-2. For example, phases and duty cycles for new operating cycles may be determined for the loads based at least in part on the phases and duty cycles for initial operating cycles and the desired demand response(s) associated with one or more demand-response events 944. Then, mapping module 948 may use one or more mapping functions 950 to map the initial operating cycles of the loads to the new operating cycles such that phases of the loads in the new operating cycles are uncorrelated. Next, transition module 952 may use one or more set-point trajectories 954 to transition the loads from initial operating points prior to the one or more demand-response events 944 to final operating points. In this way, aggregation module 930 can rapidly and reliably achieve one or more changes in the desired demand response in the one or more energy services 942 from the group of loads.

Instructions in the various modules in memory 924 may be implemented in: a high-level procedural language, an object-oriented programming language, and/or in an assembly or machine language. This programming language may be compiled or interpreted, i.e., configurable or configured, to be executed by the one or more processing units 910.

Although computer system 900 is illustrated as having a number of discrete items, FIG. 9 is intended to be a functional description of the various features that may be present in computer system 900 rather than a structural schematic of the embodiments described herein. In practice, and as recognized by those of ordinary skill in the art, the functions of the computer system 900 may be distributed over a large number of devices or computers, with various groups of the devices or computers performing particular subsets of the functions. In some embodiments, some or all of the functionality of computer system 900 may be implemented in one or more application-specific integrated circuits (ASICs) and/or one or more digital signal processors (DSPs).

In some embodiments, system 100 (FIG. 1) and/or computer system 900 include fewer or additional components. Moreover, two or more components may be combined into a single component and/or a position of one or more components may be changed. Moreover, the functionality of system 100 (FIG. 1) and/or computer system 900 may be implemented more in hardware and less in software, or less in hardware and more in software, as is known in the art.

Figure 10:
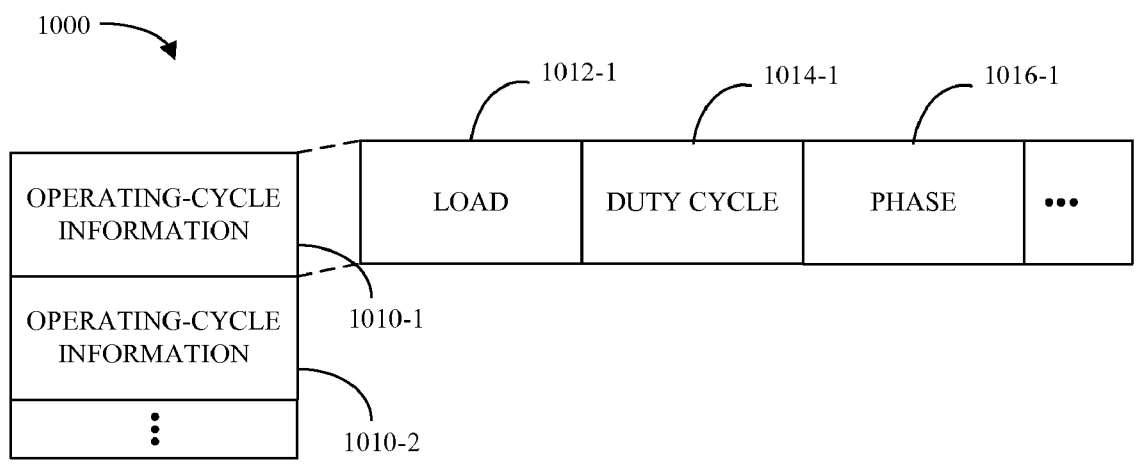
FIG. 10 is a block diagram illustrating a data structure in accordance with an embodiment of the present disclosure.

We now discuss data structures that may be used in computer system 900. FIG. 10 presents a block diagram illustrating a data structure 1000. This data structure may contain operating-cycle information 1010 for one or more loads. For example, operating-cycle information 1010-1 may include one or more groups of a load, a duty cycle and a phase, such as load 1012-1, duty cycle 1014-1 and phase 1016-1.

In some embodiments, data structure 1000 includes fewer or additional components. Moreover, two or more components may be combined into a single component and/or a position of one or more components may be changed.

While the preceding embodiments illustrate the use of the aggregation technique to provide an aggregate energy service, in other embodiments this technique may be used in a wide variety of problems in which a disparate group, with time-varying behaviors, is aggregated to provide a desired average result after a temporal event.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for aggregating an energy service from a group of loads, comprising:
    determining a final operating cycle for a load after a demand-response event, wherein the load includes one or more appliances with a time-varying operating cycle;
    mapping an initial operating cycle for the load to the final operating cycle, which involves adjusting a phase for the final operating cycle so that the phase is in accordance with a desynchronized distribution of phases of the group of loads, wherein the duty cycle for the initial operating cycle matches that of the final operating cycle; and
    using a set-point trajectory to transition the load from the initial operating cycle prior to the demand-response event to the final operating cycle.

2. The method of claim 1, wherein the transition of the load is a demand response event that achieves a desired change in the energy use from the group of loads and which is associated with the demand-response event.

3. The method of claim 1, wherein determining the final operating cycle involves generating an operating model of the load.

4. The method of claim 3, wherein the operating model includes a thermodynamic model of temperature in an enclosure.

5. The method of claim 1, wherein a given operating cycle includes a steady-state duty cycle and phase.

6. The method of claim 1, wherein the initial and final operating cycles correspond to different average power-consumption levels of the energy service.

7. The method of claim 1, wherein the mapping preserves a characteristic of the distribution of phases of the group of loads from before the demand-response event.

8. The method of claim 7, wherein the characteristic includes, on average, uncorrelated phases in the distribution of phases.

9. The method of claim 7, wherein the mapping changes the characteristic of the distribution of phases of the group of loads from an initial characteristic from before the demand-response event; and
    wherein the characteristic includes, on average, uncorrelated phases in the distribution of phases.

10. The method of claim 1, wherein a change in the desired average amount of the energy service occurs immediately at the demand-response event without requiring a delay in an occurrence of any subsequent demand-response event.

11. The method of claim 10, wherein the change in the desired average amount of the energy service occurs approximately without an increase in a relative standard deviation from prior to the demand-response event.

12. The method of claim 1, wherein the load transitions from the initial operating cycle to the final operating cycle without experiencing additional cycles from a higher power-consumption operating mode to a lower power-consumption operating mode, or from the lower power-consumption operating mode to the higher power-consumption operating mode.

13. The method of claim 1, further comprising calculating an appropriate contribution by the load to the desired average amount of the energy service, which is associated with the demand-response event, based at least in part on a price offered for the energy service and an associated disutility of the load.

14. The method of claim 1, wherein the set-point trajectory controls the temperature between two operating temperatures; and
    wherein the transition occurs over a time interval.

15. The method of claim 1, wherein the set-point trajectory is determined using one or more operating points after the demand-response event and a closed-form expression for the variation in the operating point as a function of time.

16. The method of claim 15, wherein the closed-form expression includes an exponential function.

17. The method of claim 1, wherein the set-point trajectory is determined using an initial operating point, a final operating point and a dependence of an operating point of the load corresponding to the final operating cycle.

18. The method of claim 17, wherein the dependence of the operating point is associated with a thermodynamic model of temperature in a control volume.

19. A computer-program product for use in conjunction with a computer system, the computer-program product comprising a non-transitory computer-readable storage medium and a computer-program mechanism embedded therein to aggregate an energy service from a group of loads, the computer-program mechanism including:
    instructions for determining a final operating cycle for a load after a demand-response event, wherein the load includes one or more appliances with a time-varying operating cycle;
    instructions for mapping an initial operating cycle for the load to the final operating cycle, which involves adjusting a phase for the final operating cycle so that the phase is in accordance with a desynchronized distribution of phases of the group of loads, wherein the duty cycle for the initial operating cycle matches that of the final operating cycle; and
    instructions for using a set-point trajectory to transition the load from the initial operating cycle prior to the demand-response event to the final operating cycle.

20. The computer-program product of claim 19, wherein the transition of the load is a demand response event that achieves a desired change in the energy use from the group of loads and which is associated with the demand-response event.

21. A computer system, comprising:
    a processor;
    memory; and
    a program module, wherein the program module is stored in the memory and configured to be executed by the processor, the program module to aggregate an energy service from a group of loads, the program module including:
        instructions for determining a final operating cycle for a load after a demand-response event, wherein the load includes one or more appliances with a time-varying operating cycle;
        instructions for mapping an initial operating cycle for the load to the final operating cycle, which involves adjusting a phase for the final operating cycle so that the phase is in accordance with a desynchronized distribution of phases of the group of loads, wherein the duty cycle for the initial operating cycle matches that of the final operating cycle; and instructions for using a set-point trajectory to transition the load from the initial operating cycle prior to the demand-response event to the final operating cycle.

22. The computer system of claim 21, wherein the transition of the load is a demand response event that achieves a desired change in the energy use from the group of loads and which is associated with the demand-response event.

* * * * *